(12) United States Patent
Sheares

(10) Patent No.: US 6,583,260 B2
(45) Date of Patent: Jun. 24, 2003

(54) FUNCTIONALIZED DIENE MONOMERS AND POLYMERS CONTAINING FUNCTIONALIZED DIENES AND METHODS FOR THEIR PREPARATION

(75) Inventor: Valerie V. Sheares, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 10/004,802

(22) Filed: Dec. 7, 2001

(65) Prior Publication Data

US 2002/0151673 A1 Oct. 17, 2002

Related U.S. Application Data

(60) Division of application No. 09/562,009, filed on May 2, 2000, now Pat. No. 6,344,538, and a continuation-in-part of application No. 09/138,375, filed on Aug. 24, 1998, now Pat. No. 6,100,373.

(51) Int. Cl.[7] ............................................. C08G 61/00
(52) U.S. Cl. ....................... 528/397; 528/396; 528/422; 525/242; 525/191; 585/262; 585/506; 585/422
(58) Field of Search .................... 528/396, 397, 528/422; 525/242, 191; 585/262, 506, 422

(56) References Cited

U.S. PATENT DOCUMENTS

| | | |
|---|---|---|
| 3,492,277 A | 1/1970 | Clark |
| 3,679,748 A * | 7/1972 | Jones et al. |
| 3,761,458 A | 9/1973 | Holler et al. |
| 3,796,687 A | 3/1974 | Collette et al. |
| 4,071,679 A * | 1/1978 | Uraneck et al. |
| 4,139,417 A | 2/1979 | Marie et al. |
| 4,423,196 A | 12/1983 | Arlt et al. |
| 4,701,507 A | 10/1987 | Mate et al. |
| 4,987,200 A | 1/1991 | Datta et al. |
| 5,153,282 A | 10/1992 | Datta et al. |
| 5,206,300 A | 4/1993 | Chamberlain |
| 5,216,083 A | 6/1993 | Grubbs et al. |
| 5,280,066 A | 1/1994 | Tekkanat et al. |
| 5,310,798 A | 5/1994 | Lawson et al. |
| 5,354,822 A | 10/1994 | Antkowiak et al. |
| 5,405,911 A | 4/1995 | Handlin, Jr. et al. |
| 5,430,095 A | 7/1995 | Ishiura et al. |
| 5,473,029 A | 12/1995 | Osman |
| 5,508,333 A | 4/1996 | Shimizu |
| 5,627,248 A | 5/1997 | Koster et al. |
| 5,629,047 A | 5/1997 | Sharma et al. |
| 5,665,812 A | 9/1997 | Gorce et al. |
| 6,100,373 A | 8/2000 | Sheares |
| 6,344,538 B1 | 2/2002 | Sheares |

OTHER PUBLICATIONS

Petzhold et al., "On the polymerization of dialkylaminoisoprenes, 1 Anionic and radical homopolymerization of 5–(n, N–diisopropylamino) isoprene", *Makromol. Chem., Rapid Commun.* 14, 33–43 (1993). Abstract.

Petzhold et al., "On the Anionic Polymerization of (Dialkylamino) isoprenes. 2. Influence of the Tertiary Amino Group on the Polymer Microstructure", *Macromolecules* 1994, 27, 3707–3713. Abstract.

Takenaka et al., "Polymerization of Monomers Containing Functional Silyl Groups. 10. Anionic Polymerization of 2–Silyl–Substituted 1,3–Butadienes with Mixed Substituents", *Macromolecules* 1992, 25, 96–101.

Hirao et al., "Polymerization of Monomers Containing Functional Silyl Groups. 13. Anionic Polymerization of 2–[N,N–Dialkylamino dimethylsily1]–1,3–butadiene Derivatives", *Macromolecules* 1998, 31, 281–287.

Mannebach, et al., The Anionic Polymerization of Dialkylaminoisoprenes. Part 4 . *Macromol. Chem. Phys.* 199(5), 909–912 (1998). Abstract.

Petzhold et al., "The Anionic copolymerization of 5–(N, N–diisopropylamino) isoprene with styrene", *Macromol. Chem. Phys.* 196, 2625, 2636 (1995). Abstract.

Arenz et al., "A Novel Synthesis of 2–Aminomethyl–1, 3–butadienes from N,O–Acetals", *Angew. Chem. Int. Ed. Engl.* 29, (1990) No. 8.

Koshimura, et al., "Water–developable photosensitive polymer compostiion with low water swelling capability," 1997. Abstract.

Stadler, et al., "The anionic polymerization of 5–N, N–dialkylaminoisoprenes," Am. Chem. Soc., Div. Polym. Chem., 35(2), 464–5. Abstract.

* cited by examiner

Primary Examiner—Duc Truong
(74) Attorney, Agent, or Firm—Dickstein Shapiro Morin & Oshinsky LLP

(57) ABSTRACT

Functionalized monomers and polymerized functionalized monomers selected from the group consisting of 2-(N,N-dimethylaminomethyl)-1,3-butadiene, 2-(N,N-diethylaminomethyl)-1,3-butadiene, 2-(N,N-di-n-propylaminomethyl)-1,3-butadiene, 2-(cyanomethyl)-1,3-butadiene, 2-(aminomethyl)-1,3-butadiene, 2-(hydroxymethyl)-1,3-butadiene, 2-(carboxymethy)-1,3-butadiene, 2-(acetoxymethyl)-1,3-butadiene, 2-(2-alkoxy-2-oxoethyl)-1,3-butadiene, 2,3-bis(cyanomethyl)-1,3-butadiene, 2,3-bis(dialkylaminomethyl)-1,3-butadiene, 2,3-bis(4-ethoxy-4-4-oxobutyl)-1,3-butadiene and 2,3-bis(3-cyanopropyl)-1,3-butadiene, and methods for preparing such functionalized diene monomers and polymers.

8 Claims, No Drawings

FUNCTIONALIZED DIENE MONOMERS AND POLYMERS CONTAINING FUNCTIONALIZED DIENES AND METHODS FOR THEIR PREPARATION

This application is a divisional of application Ser. No. 09/562,009, filed May 2, 2000 now U.S. Pat. No. 6,344,538, and a continuation-in-part of Ser. No. 09/138,375, filed Aug. 24,1998 now U.S. Pat. No. 6,100,373.

FIELD OF THE INVENTION

This invention relates to functionalized diene monomers, polymers containing functionalized dienes, and methods for preparing functional or polar group-bearing diene monomers and polymers.

BACKGROUND OF THE INVENTION

Interest in the field of functionalized polymeric materials stems from the desire to combine the unique properties of a functional group with those of a high molecular weight polymer.

Functionalized polymers have the potential for crosslinking via ionic interactions and covalent bonds, leading to improved properties for applications such as polymer blends. The introduction of specifically interacting groups is a particularly versatile route to miscibility enhancement. Other applications of these materials are in membranes, packaging, dispersants, adhesives and coatings. In addition, functionalized polymers may be used in the modification of existing materials to alter their adhesion, processability, solubility, dyeability, thermal, mechanical, and other properties.

Functional groups can be introduced into a polymer by two general approaches: (1) chemical modification of a nonfunctionalized, preformed polymer, or (2) polymerization or copolymerization of monomers containing the functionality. The second method has the advantages of producing a more homogeneous polymer with more uniform functionalization, the ability to analyze the monomers prior to polymerization, and the ability to control loading and distribution of functional groups along the polymer backbone.

A number of different functional or other polar groups have been incorporated into various polyolefin and polyvinyl materials. Successful functionalization is typically performed after polymer formation. In many instances, only terminal functionalization is achieved. Where functionalized monomers have been polymerized to prepare functional group-bearing polymers, the extra steps of masking the monomer functionality prior to polymerization, and then subsequently removing the mask, have been required. Limited success has previously been achieved in the polymerization of functionalized diene monomers, although such monomers have enormous commercial significance and utility in materials such as elastomers, adhesives, sealants, coatings, molded mechanical articles, and the like.

Initial work with nonsilicon-containing functionalized dienes was reported by Petzhold et al., which focused on anionic polymerization of N,N-diethylaminoisoprene and elucidation of microstructures. Petzhold, C., et al. (*Makromol. Chem., Rapid Commun* 1993, 14, 33–43) refers to low yields (<50%) of low molecular weight (number-average molecular weight 5,000 g/mol) polymers obtained by anionic and radical polymerization of 2-(N,N-disopropylaminomethyl)-1,3-butadiene. Petzhold, C., et al. (*Macromolecules* 1994, 27, 3707–13) refers to low yields of low molecular weight polymers obtained by anionic polymerization of a series of 2-(N,N-dialkylaminomethyl)-1,3-butadienes.

What is needed are new functionalized diene monomers and methods for preparing and polymerizing functionalized dienes to produce high yields of functionalized diene polymers, without the requirements of masking and unmasking the functional group, or of adding the functionality only after polymerization.

SUMMARY OF THE INVENTION

The present invention provides functionalized diene monomers and methods for preparing and polymerizing such functional group-bearing monomers to prepare high yields of functionalized polymers and copolymers.

The diene monomers and functionalized polymers of the invention include, but are not limited to, butadiene monomers and polymerized functionalized butadiene monomers such as: 2-(N,N-dimethylaminomethyl)-1,3-butadiene (Compound 1a), 2-(N N-diethylaminomethyl)-1,3-butadiene (Compound 1b), 2-(N,N-di-n-propylaminomethyl)-1,3-butadiene (Compound 1c), 2-(cyanomethyl)-1,3-butadiene (Compound 2), 2-(aminomethyl)-1,3-butadiene (Compound 3), 2-(hydroxymethyl)-1,3-butadiene (Compound 4), 2-(carboxymethyl)-1,3-butadiene (Compound 5), 2-(acetoxymethyl)-1,3-butadiene (Compound 6), 2-(2-alkoxy-2-oxoethyl)-1,3-butadiene (Compound 7), as well as disubstituted functionalized diene monomers and polymerized disubstituted functionalized diene monomers such as 2,3-bis(cyanomethyl)-1,3-butadiene (Compound 8), 2,3-bis(dialkylaminomethyl)-1,3-butadiene (Compound 9), 2,3-bis(4-ethoxy-4-oxobutyl)-1,3-butadiene (Compound 10) and the 2,3-bis(3-cyanopropyl)-1,3-butadiene (Compound 11). Also provided herein are methods for synthesizing these and other functionalized diene monomers, polymers, and copolymers.

The resulting polymers and copolymers may be used as is or blended with other materials to make a variety of new products, including adhesives, sealants, surfactants, elastomers, ionomers for, e.g., coatings and membranes, and may also be employed as functionalized polyolefin precursors. The resulting functionalized polymers or polymer blends may be quaternized, hydrogenated, cross-linked, or subject to other known polymer reactions to enhance properties for specific applications, as described in detail herein.

Additional objects and advantages of the invention will be set forth in part in the description which follows, and in part will be obvious from the description, or may be learned by the practice of the invention. The objects and advantages of the invention will be attained by means of the instrumentalities and combinations particularly pointed out in the appended claims.

DETAILED DESCRIPTION OF THE PREFERRED EMBODIMENTS

Reference will now be made in detail to the presently preferred embodiments of the invention, which together with the following examples, serve to explain the principles of the invention.

Functionalized Diene Monomers

The present invention provides functionalized diene monomers of the formula:

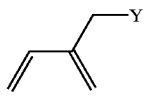

Compound 1: Y=NR₂ (1a: R=methyl; 1b: R=ethyl; 1c: R=n-propyl)
Compound 2: Y=CN
Compound 3: Y=NH₂
Compound 4: Y=OH
Compound 5: Y=COOH
Compound 6: Y=OCOCH₃
Compound 7: Y=COOR (R=any alkyl group)

and similar functionalized monomers, having various functional groups, which may be synthesized by following the teachings provided herein.

The present invention also provides disubstituted functionalized diene monomers of the formula:

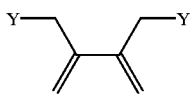

Compound 8: Y=CN
Compound 9: Y=NR₂ (9a: R=methyl; 9b: R=ethyl; 9c: R=n-propyl)

and similar disubstituted functionalized diene monomers, having various functional groups, which may be synthesized by following the teachings provided herein.

The invention further provides disubstituted functionalized diene monomers of the formula:

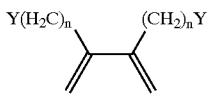

Compound 10: Y=COOEt
Compound 11: Y=CN and similar disubstituted functionalized monomers, having various functional groups, all of which may be synthesized by one of ordinary skill in the art given the teachings provided herein.

Monomer Synthesis and Purification

Compounds 1–9 and similar functionalized diene monomers are preferably synthesized by the techniques discussed below, although any suitable method may be used. The invention, including the polymers and polymerization products and processes of the invention, should be understood as not being limited to the following preferred monomers or monomer syntheses.

Compounds 1, 2, 3, 4 and 6 can be synthesized from the monobromide precursor, 2-(bromomethyl)-1,3-butadiene in several ways. Two methods are described below for the synthesis of the monobromide. The second method gives improved yields and purity.

The first method for the synthesis of 2-(bromomethyl)-1,3-butadiene involves the synthesis of 1,4-dibromo-2-methyl-2-butene by reacting isoprene with bromine at a temperature in the range of about 20° C. or below. The dibromide may then be reacted at elevated temperature in the range of about 120° C. with 1,3-dimethyl-3,4,5-6-tetrahydro-2(1H)-pyrimidinone (DMPU). The resulting 2-(bromomethyl)-1,3-butadiene is then reacted with the desired dialkylamine, sodium cyanide, phthalamide then hydrazine, potassium acetate then base, and potassium acetate to give 1, 2, 3, 4 and 6, respectively.

The second method for the synthesis of 2-(bromomethyl)-1,3-butadiene is preferred as it leads to higher yields of higher purity functionalized dienes. It involves the synthesis of a cyclic sulfone, 3-methyl-2,5-dihydrothiophene-1,1-dioxide, via reaction of isoprene with sulfur dioxide. This sulfone is a solid and allows for purification by recrystallization. The sulfone is then reacted with NBS to give the monobromide, 3-bromomethyl-2,5-dihydrothiophene-1,1-dioxide. Upon heating the monobromide, SO₂ is released and pure 2-(bromomethyl)-1,3-butadiene is produced. The monobromide is allowed to react in the same way with various compounds as described above to give 1, 2, 3, 4 and 6.

Although it is possible to synthesize Compounds 5 and 7 from the monobromide precursor route, 5 and 7 were made differently as described below. To synthesize 5, isoprene was reacted with potassium t-butoxide then butyl lithium followed by carbon dioxide. Compound 7 is readily obtained from Compound 5 by refluxing with an alcohol.

Compounds 8 and 9 are obtained by the second precursor route with one change, the starting material is changed from isoprene to 2,3-(dimethyl)-1,3-butadiene. The 2,3-(dibromomethyl)-1,3-butadiene precursor can be reacted with a number of nucleophiles including those listed above to give difunctionalized dienes. To obtain 8 and 9, the dibromo precursor is reacted with sodium cyanide or a dialkylamine, respectively.

Compounds 10 and 11 are synthesized by a route differing from 1–9. Compound 10 is preferably synthesized by mixing ethyl4-chlorobutyrate with acetone and sodium iodide. 1,2-dibromomethane is then mixed with zinc granules and THF. Chlorotrimethylsilane is then added to this mixture. Subsequently, the ethyl-4-iodobutyrate mixture is added and the mix is heated to about 50° C. Lithium chloride and copper cyanide are then added. The solution is warmed to about 0° C. and then cooled to about −78° C. or less, and 1,4-dichlorobutyne is added. The reaction is then quenched and the organic layer is extracted, dried and filtered. Varying diester derivatives of Compound 10 may be synthesized in a similar manner by varying the alkyl-4-haloester added to acetone and sodium iodide.

Compound 11 is preferably synthesized in the same manner as indicated above with respect to Compound 10, except that the synthesis starts with 4-chlorobutyronitrile instead of ethyl-4-chlorobutyrate. Again, any cyano monomer can be prepared by varying the 4-halonitrile.

Accordingly, the monomers and polymers according to the present invention are not limited to the preferred compounds, Compounds 1a–c, 2, 3, 4, 5, 6, 7, 8, 9a–c, 10, and 11, but also extend to other aminoisoprenes, diester derivatives, cyano monomers, and other functionalized diene monomers and polymers that can be prepared given the detailed description of the preferred product and process embodiments provided herein.

Polymerization

According to this invention, polymerization and recovery of polymer are suitably carried out according to various methods suitable for diene monomer polymerization processes. This includes batchwise, semi-batchwise or continuous operations under conditions that exclude air and other atmospheric impurities, particularly moisture. The polymerization of the functionalized monomers of the invention may also be carried out in a number of different polymerization reactor systems, including but not limited to bulk polymerization, solution polymerization, suspension polymerization, emulsion polymerization, and precipitation polymerization systems. The currently preferred methods are solution, bulk and emulsion polymerizations.

The polymerization reaction may use a free radical redox initiator, although anionic, cationic, and catalytic initiation systems may also be employed. The preferred initiation systems are free radical and anionic, depending upon the particular monomers being polymerized. An advantage of free radical polymerization is that reactions can typically be carried out under less rigorous conditions than ionic polymerizations. Free radical initiation systems also exhibit a greater tolerance of trace impurities.

Examples of free radical initiators that are useful in the practice of the present invention are those known as "redox" initiators, such as combinations of chelated iron salts, sodium formaldehyde sulfoxylate, and organic hydroperoxides. Representative of organic hydroperoxides are cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred.

The reaction temperature is typically maintained in the range of between 0 and 150° C. Temperatures between about 70 and 120° C. are generally preferred. The reaction pressure is not critical. It is typically only sufficiently high to maintain liquid phase reaction conditions; it may be autogenic pressure, which will vary depending upon the components of the reaction mixture and the temperature, or it may be higher, e.g., up to 1000 p.s.i. High pressures are suitably obtained by pressuring with an inert gas.

In batch operations, the polymerization time of functionalized diene monomers can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours.

The concentration of monomer in the reaction mixture may vary upward from 5 percent by weight of the reaction mixture, depending on the conditions employed; the range from 20 to 80 percent by weight is preferred.

The polymerization reactions according to this invention may be carried out in a suitable solvent which is liquid under the conditions of reaction and relatively inert. The solvent may have the same number of carbon atoms per molecule as the diene reactant or it may be in a different boiling range. Preferred as solvents are alkane and cycloalkane hydrocarbons. Suitable solvents are, for example, hexane, cyclohexane, methylcyclohexane, or various saturated hydrocarbon mixtures. Aromatic hydrocarbons such as benzene, toluene, isopropylbenzene, xylene, or halogenated aromatic compounds such as chlorobenzene, bromobenzene, or orthodichlorobenzene may also be employed. Other useful solvents include tetrahydrofuran and dioxane.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

Preferably the polymerization is carried out to complete functionalized diene monomer conversion in order to incorporate essentially all of the polymerizable functional group-bearing monomer. Incremental addition, or a chain transfer agent, may be used in order to avoid excessive gel formation. Such minor modifications are within the skill of the artisan. After the polymerization is complete, the polymer is recovered from a slurry or solution of the polymer. A simple filtration may be adequate to separate polymer from diluent. Other means for separating polymer from diluent may be employed. The polymer may be treated, separately or while slurried in the reaction mixture, in order to separate residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% hydrochloric acid. Following this initial coagulation, the polymers may be washed several more times in methanol.

The functionalized diene monomers according to the present invention may also be polymerized with one or more comonomers. Some adjustments in the polymerization recipe or reaction conditions may be necessary to obtain a satisfactory rate of polymer formation, depending on the amount of functionalized monomer included and the other monomers involved. Examples of comonomers that are useful in the practice of this invention are diene monomers such as butadiene, isoprene, and hexadienes. One may, in addition to the diene monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different functionalized monomers and mixtures of different comonomers may be used. The monomer charge ratio by weight is normally from about 0.10/99.9 to 99.9/0.10 functionalized monomer to comonomer (including any additional vinyl monomer). A charge ratio by weight of about 5/95 to about 80/20 is preferred with 10/90 to 40/60 the most preferred. According to one embodiment, the weight ratio of functionalized diene monomer to diene monomer to vinyl monomer may range from 5:75:20 to 95:5:0. Ratios will vary depending on the amount of chemical functionality desired to be incorporated and on the reactivity ratios of the monomers in the particular polymerization system used.

Polymers

The polymers containing polar compounds, produced according to this invention, are generally produced as substantially linear polymers having, in general, a number average molecular weight in the range from about 1,000 to a million. The polymer structures from each of the representative monomers, Compounds 1–11, are shown below.

Compounds 1a, 1b, and 1c polymerize to poly[2-(N,N-dimethylaminomethyl)-1,3-butadiene], poly[2-(N,N-diethylaminomethyl)-1,3-butadiene] and poly[2-(N,N-di-n-propylaminomethyl)-1,3-butadiene], respectively. The possible microstructures include:

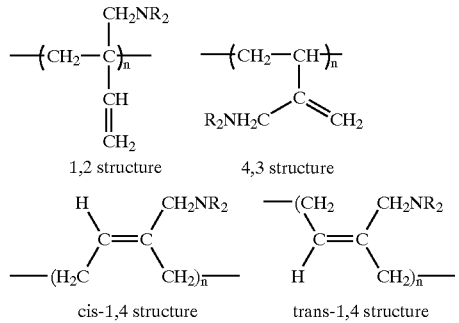

for 1a, R=CH$_3$
for 1b, R=CH$_2$CH$_3$
for 1c, R=CH$_2$CH$_2$CH$_3$

Compound 2 polymerizes to poly[2-(cyanomethyl)-1,3-butadiene]. The possible microstructures include:

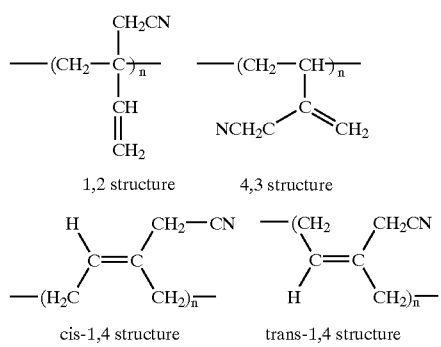

Compound 3 polymerizes to poly[2-(aminomethyl)-1,3-butadiene]. The possible microstructures include:

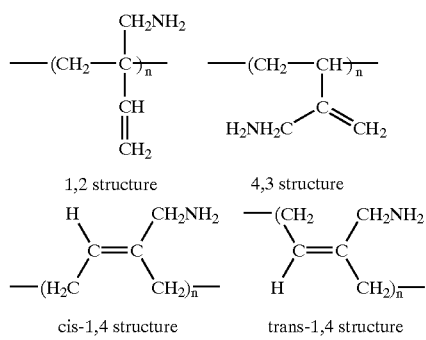

Compound 4 polymerizes to poly[2-(hydroxymethyl)-1,3-butadiene]. The possible microstructures include:

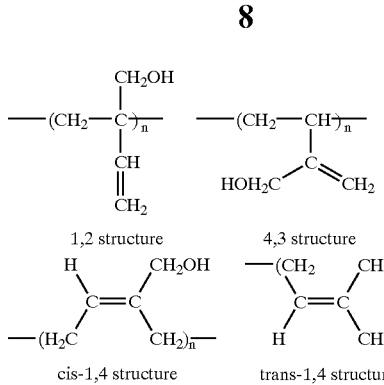

Compound 5 polymerizes to poly[2-(carboxymethyl)-1,3-butadiene]. The possible microstructures include:

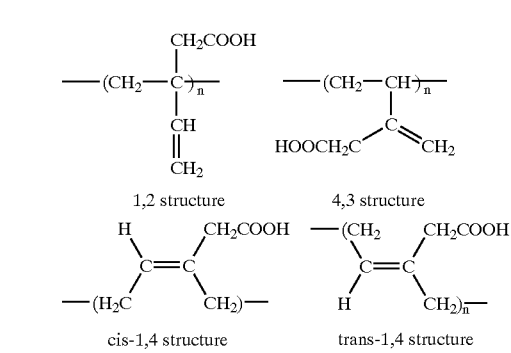

Compound 6 polymerizes to poly[2-(acetoxymethyl)-1,3-butadiene. The possible microstructures include:

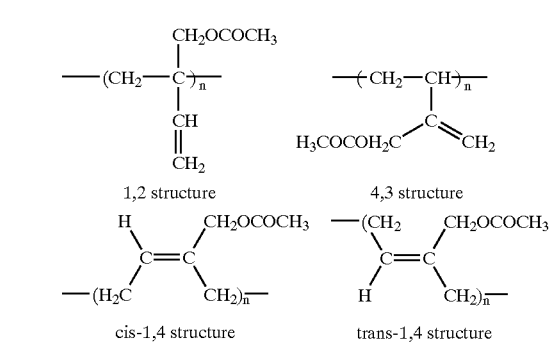

Compound 7 polymerizes to poly[2-(2-alkoxy-2-oxoethyl)-1,3-butadiene]. Possible microstructures include:

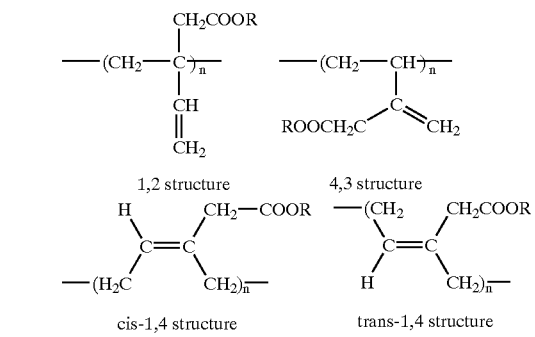

Compound 8 polymerizes to poly[2,3-(cyanomethyl)-1,3-butadiene]. The three possible microstructures are:

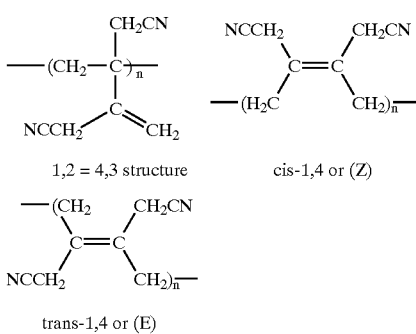

1,2 = 4,3 structure    cis-1,4 or (Z)

trans-1,4 or (E)

Compound 9 polymerizes to poly[2,3-bis (dialkylaminomethyl)-1,3-butadiene]. Possible microstructures include:

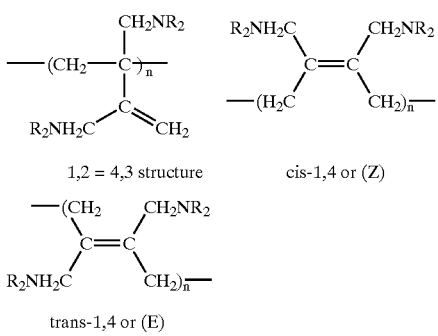

1,2 = 4,3 structure    cis-1,4 or (Z)

trans-1,4 or (E)

Compound 10 polymerizes to poly[2,3-(ethylbutanoate) butadiene].

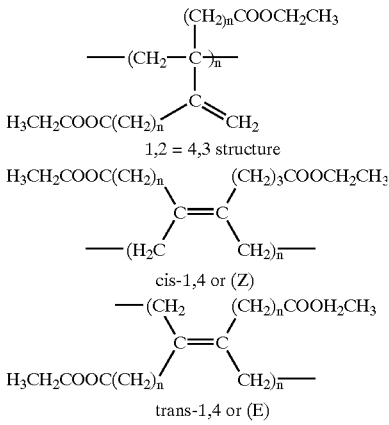

1,2 = 4,3 structure cis-1,4 or (Z)

trans-1,4 or (E)

Compound 11 polymerizes to poly[2,3-bis(3-cyanopropyl)-1,3-butadiene]. Possible microstructures include:

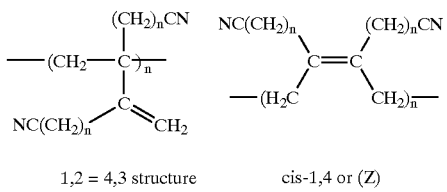

1,2 = 4,3 structure    cis-1,4 or (Z)

-continued

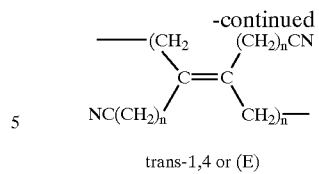

trans-1,4 or (E)

Polymer Properties

The homopolymers and copolymers produced according to this invention vary widely in physical and chemical properties, depending on the polar groups employed, the ratio of polar compound to hydrocarbon compound in the product, and the stereochemistry and relative arrangement of polar compound and hydrocarbon units in the polymer chains.

Following crosslinking (thermally or chemically) many of the functionalized polymers of the present invention are elastomeric. When the $T_g$ of the original polymer is below room temperature, the final crosslinked polymer is typically elastomeric. The low glass transition temperatures ($T_g$) of many of the resulting functionalized polymers herein make these polymers particularly good precursors for elastomers. After crosslinking, i.e., further reaction of the remaining double bonds in the functionalized diene polymer to connect some or all of these bonds between polymer chains, the final material is insoluble in common organic solvents (chloroform, tetrahydrofuran, methylene chloride, acetone, benzene, etc.). This may be accomplished by irradiation with UV light or by vulcanization (addition of sulfur and heating).

Thermoplastic elastomers, actually copolymers of a material with a $T_g$ above room temperature and a polymer with a $T_g$ below room temperature, may also be conveniently formed. For example:

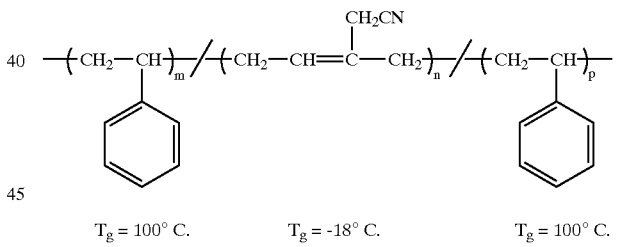

$T_g = 100°$ C.    $T_g = -18°$ C.    $T_g = 100°$ C.

The higher $T_g$ chain ends serve as the "crosslinkers" and give elastomeric materials. Commercial materials, e.g., spandex, fall into this category.

The polymerized aminomethylbutadienes (1a–1c and 9) can also be quaternized or protonated, if desired, to the salt form (ionic form).

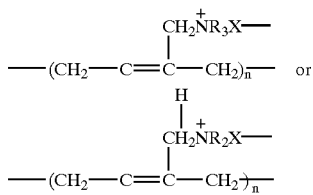

These materials are useful in various applications such as coatings and membranes, etc. This may be achieved by standard addition of a reagent ($CH_3I$, HCl, etc.) to change the tertiary group to a quaternary group. The nitrogen, for example, will then have four groups attached and a positive charge. This is a salt form that may be completely or partially H$_2$O soluble. Furthermore, if the groups are quaternized about 10–20%, useful ionomers will result. Compounds 1a, 1b, and 1c can be quaternized to produce functionalized ionomers for miscibility enhancement in polymer blends and various other applications.

Other applications include functionalized polyolefin precursors (after hydrogenation of polymers). In the preferred functionalized polymers, the final materials typically contain C=C bonds. Once hydrogenated, these will become C—C bonds and thus the final polymers will be polyolefins. The invention therefore provides functionalized polyolefins in one step. The monomers can also be covalently bound modifiers to existing materials.

Adhesive properties also originate from the polymeric functional groups. The aminoisoprenes are quite adhesive, unlike the nonfunctionalized material, polyisoprene. The polymers of this invention are therefore particularly useful in surface coatings and adhesives since the presence of polar groups causes excellent adherence of the coatings to various substrates, such as metals, glasses, and plastics.

The resulting functionalized diene polymers and copolymers are also suitable for the production of numerous molded or extruded manufactured articles such as containers, packaging films, textile fibers, and the like, and for use as rubbers, such as in tires. The incorporation of polar dienes into rubbery hydrocarbon copolymers according to this invention also provides a novel and improved method of functionalization and derivatization.

The physical properties of polymers produced according to this invention vary, depending on the polar compound employed, the proportion thereof in the total polymer, and the method of preparation of the polymer, i.e., whether it is prepared by homopolymerization, random copolymerization or block copolymerization. The polymers may be oily liquids, glassy solids, rubbery solids or highly crystalline polymers.

It is to be understood that the application of the teachings of the present invention to a specific problem or environment will be within the capabilities of one having ordinary skill in the art in light of the teachings contained herein. Examples of the compounds and compositions of the present invention and methods of their preparation and use appear in the following examples.

EXAMPLE 1

The object of this Example is to show a preferred synthesis of functionalized isoprene monomers of the formula:

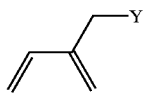

Compound 1:
1a: Y=NMe 2-(N,N-dimethylaminomethyl)-1,3-butadiene
1b: Y=NEt$_2$-(N,N-diethylaminomethyl)-1,3-butadiene
1c: Y=N(n-propyl)$_2$, 2-(N,N-di-n-propylmethyl)-1,3-butadiene
Compound 2: Y=CN, 2(cyanomethyl)-1,3-butadiene
Compound 3: Y=NH$_2$, 2-(aminomethyl)-1,3-butadiene
Compound 4: Y=OH, 2-(hydroxymethyl)-1,3-butadiene
Compound 5: Y=COOH, 2-(carboxymethyl)-,3-butadiene
Compound 6: Y=OCOCH$_3$, 2-(acetoxymethyl)-1,3-butadiene
Compound 7: Y=COOR, 2-(2-alkoxy-2-oxoethyl)-1,3-butadiene Synthesis of Compounds 1a–c, 3, 4 and 6

The precursor for each of these compounds is 2-bromomethyl-1,3-butadiene. It can be synthesized in several ways. Two possibilities are described in detail below. Method 1 for Synthesis of 2-bromomethyl-1,3-butadiene.

Step 1: Synthesis of 1,4-dibromo-2-methyl-2-butene

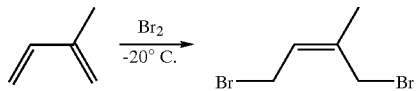

Isoprene (68.12 g, 1 mol) was added to a round bottom flask cooled with a dry ice/acetone bath and stirred. Using an addition funnel, bromine was added (159.82 g, 1 mol) dropwise at a rate necessary to keep the temperature at −20° C. or below. When bromine addition was complete, the flask was purged with nitrogen, covered with foil and stored in refrigerator until the next step. The yield of this step was almost 100%. The product is a light yellow liquid. The boiling point is 78–80° C./10 Torr. The molecular weight is 228 g/mol. The structure was verified by $^1$H-NMR (300 MHz, CDCl$_3$): 5.91 (t, 1H), 3.96 (m, 4H), 1.88 (s, 3H).

Step 2: Synthesis of 2-bromomethyl-1,3-butadiene

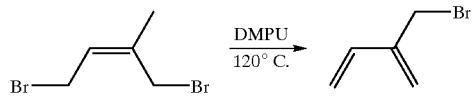

Using 2:1 v/v DMPU (1,3-dimethyl-3,4,5,6-tetrahydro-2 (1H)-pyrimidinone):dibromide, both reagents (200 mL DMPU and 1 mol dibromide) were added to a round bottom flask. The solution was stirred and heated until temperature reached 120° C. A water aspirator equipped with cold trap was used to pull vacuum. When the internal temperature reached 120° C., vacuum was pulled and the monobromide was collected in a round bottom flask. The flask was then purged with nitrogen, covered with foil and stored in a refrigerator until the next step. The yield of this step was approximately 50%. The product is a light yellow liquid. The molecular weight is 147 g/mol and boiling point is 68° C./80 Torr. The structure was verified by $^1$H-NMR and GC-Mass spectrometry (300 MHz, CDCl$_3$): 4.12 (s, 2H), 6.47 (dd, 1H), 6.1–6.4 (2s, 2d, 4H).
Method 2 for Synthesis of 2-bromomethyl-1.3-butadiene.

Step 1: Synthesis of 3-methyl-2,5-dihydrothiophene-1,1-dioxide

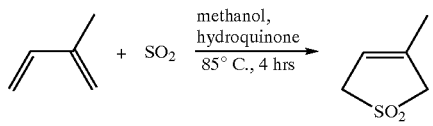

Newly distilled isoprene was used in the reaction. 50 mL sulfur dioxide (liquid, cooled by acetone-dry ice bath)<100 mL isoprene, 40 mL methanol and 2 g hydroquinone were added to a 300 mL high-pressure reactor. The vessel was then heated up to 85° C. for 4 hours. After being cooled to room temperature, yellow crystals precipitated. One recrystallization from water gave pure product in over 90% yield.

Step 2: Synthesis of 3-bromomethyl-2,5-dihydrothiophene-1,1-dioxide

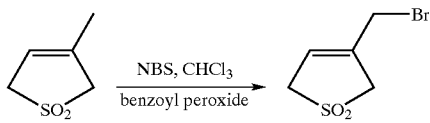

A 1L flask was charged with 65 g 3-methyl-2,5-dihydrothiophiene-1,1-dioxide (0.49 mole), 87 g N-bromosuccinimide, 6 g benzoyl peroxide and 500 mL chloroform. The solution was refluxed at 70° C. for 24 hours. After the solution was cooled to room temperatuer, two-thirds of the chloroform was removed by rotary evaporation. The solid (succinimide) formed was removed by filtration. The last trace of chloroform was then removed under reduced pressure. Methanol was added to the residual oil and the mixture was cooled in a refrigerator. The crystals formed in 18 hours. After two recrystallizations from ethanol, 35 g of product was obtained (35%).

Step 3: Synthesis of 2-(bromomethyl)-1,3-butadiene

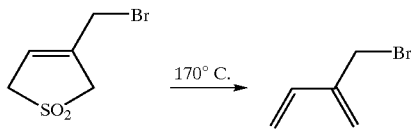

27 g 3-bromomethyl-2,5-dihydrothiophene (0.13 mol) was heated to 170° C. under reduced pressure in a flask connected to an ice-cooled receiver. The fraction between 35° C. and 45° C. was collected. After being bubbled with nitrogen, 15 g of light yellow liquid was obtained in high purity (80%).

Synthesis of Compounds 1a–c, 2, 3, 4 and 6

The monobromide precursor, synthesized by Method 1 and Method 2, can be reacted to give 1a–c, 2, 3, 4 and 6.

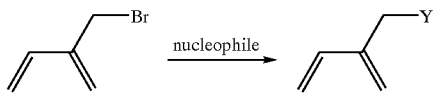

Compound 1: Y=NR$_2$ (1a: R=methyl; 1b: R=ethyl; 1c: R=n-propyl)
Compound 2: Y=CN
Compound 3: Y=NH$_2$
Compound 4: Y=OH
Compound 6: Y=OCOCH$_3$ Compound 1a–1c:

Two equivalents of HNR$_2$ and ethyl ether were added to 2-(bromomethyl)-1,3-butadiene dropwise. White salt formed immediately. The mixture was stirred for 20 h at various temperatures depending on the reactivity of the dialkyl amine utilized. Saturated NaOH solution was added to the mixture until pH reached 11. The compounds (1a–c) were extracted using ethyl ether three times. After rotary evaporation of the ethyl ether, the product was cleaned by distillation under reduced pressure.

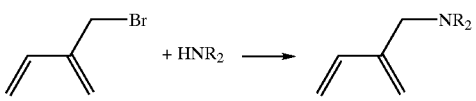

Compound 2.

To a round bottom flask was added monobromide (73.5 g, 0.5 mol) made in Method 1 or 2 and the desired nucleophile (73.3 g sodium cyanide) and solvent (500 mL acetonitrile). The mixture was stirred at room temperature for 24 hours. To work up, the mixture was quenched with water. The product was extracted with ether, washed with water and saturated sodium chloride solution. The organic phase was dried using magnesium sulfate, filtered and evaporated to remove the solvent. The compound 2 is a clear liquid. The molecular weight is 93 g/mol and the structure was verified by $^1$H-NMR and GC-Mass spectrometry. $^1$H-NMR (300 MHz, CDCl$_3$): δ 6.47 (dd, 1H), 5.28 (s, 1H), 5.33 (s, 1H), 5.23 (d, 1H), 5.20 (d, 1H).

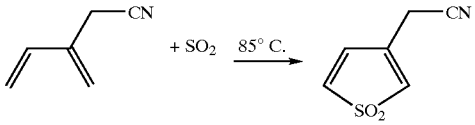

Purification of Compound 2.

The same sulfone chemistry used in Method 2 for the synthesis of 2-(bromomethyl)-1,3-butadiene was applied to the purification of the cyano monomer. Again, the sulfone is a solid and can be recrystallized.

A 300 mL steel reaction vessel was precooled before loading by putting it in a acetone-dry ice bath. When the temperature was low enough (<−10° C.), it was charged with 30 g of Compound 1, 30 mL of liquid sulfur dioxide, 10 mL of methanol and 0.25 g of hydroquinone. The vessel was sealed quickly, heated slowly to 85° C., and maintained at that temperature for 4 hours. It was then cooled to room temperature. The resulting sulfone was filtered, washed with cold methanol and dried in vacuum oven. The yield of this step was approximately 30–35%. The product is a green crystal. The molecular weight is 157 g/mol. The structure was verified by $^1$H-NMR. $^1$H-NMR (300 MHz, CDCl$_3$): δ 6.20 (s, 1H), 3.91 (s, 2H), 3.79 (s, 2H), 3.30 (s, 2H).

Recovery of Compound 2.

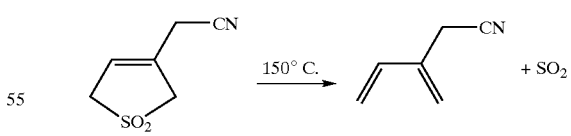

To a 100 mL round bottom flask was added 2-cyanomethyl-2,5-dihydrothiophene-1,1-dioxide (30 g). It was stirred and heated to 150° C. A water aspirator equipped with a cold trap was used to collect the product. The yield of this step is approximately 80–85%. The product is a clear liquid. The molecular weight is 93 g/mol. The structure was verified by $^1$H-NMR and GC-Mass spectrometry. $^1$H-NMR (300 MHz, CDCl$_3$): δ 6.46 (dd, 1H), 5.47 (s, 1H), 5.33 (s, 1H), 5.24 (d, 1H), 5.19 (d, 1H).

Compound 3.

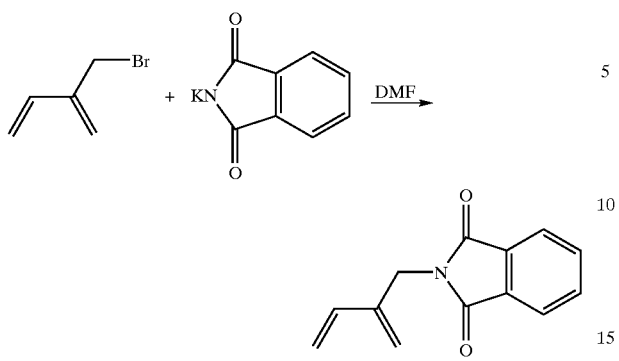

14.6 g 2-(bromomethyl)-1,3-butadiene (0.1 mol), 37 g phthalimide (0.2 mol) and 50 mL DMF were charged into a flask. The mixture was stirred at room temperature for 24 hours. Large excess water was then added and a precipitate formed immediately. The solid was collected by filtration. After drying, 19 g N-phthalimidemethyl-1,3-butadiene was obtained (90%).

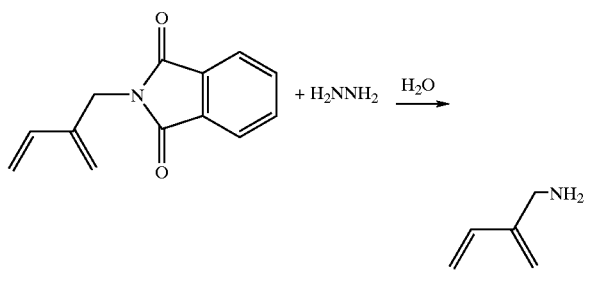

1.5 equivalent $H_2NNH_2$ was added to N-phthalimidemethyl-1,3-butadiene. The mixture was stirred at room temperature for 6 hours. 2-(aminomethyl)-1,3-butadiene was extracted out of water using ethyl ether and was distillated under reduced pressure.

Compound 4.

Note: Compound 4 is synthesized from Compound 6 as described below.

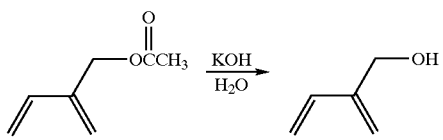

Two equivalents of KOH were dissolved in excess ethanol. The mixture was added to Compound 6 slowly. After stirring at room temperature for 24 hours, water was added and the desired product was extracted using ethyl ether. The molecular weight of Monomer 4 is 84 g/mol.

Compound 6.

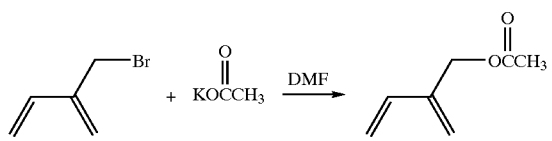

A round bottom flask was charged with 14.6 g of 2-(bromomethyl)-1,3-butadiene (0.1 mol), 19.6 g potassium acetate (0.2 mol), and 50 mL DMF. The mixture was stirred at room temperature for 48 hours for a complete conversion. Water (20 mL) was then added to dissolve the excess potassium acetate and KBr formed. The product was extracted using ethyl ether and was further purified by distillation. The yield was over 90%. The molecular weight of Compound 6 is 126 g/mol.

Synthesis of Compounds 5 and 7.

Unlike Compounds 1a–1c, 2, 3, 4 and 6, Compounds 5 and 7 were synthesized from isoprene (not via the monobromide precursor). Compound 5 is the precursor of Compound 7. The syntheses are described below.

Compound 5.

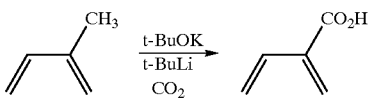

To a mixture of 3.36 g (30 mmol) of KO-t-Bu, 10 mL of pentane, and 17 mL (30 mmol) of 1.7 M t-BuLi in hexane in a nitrogen-filled round bottom flask was added, dropwise via dropping funnel over 5 min. with stirring, 2.9 mL isoprene. After being stirred 10 min. more, dry $CO_2$ was run through. The anion was quenched with water. The desired product was separated by distallation. The molecular weight of Compound 7 is 112 g/mol.

Compound 7.

The acid, Compound 5, is the precursor of the desired alkyl ester, Compound 7.

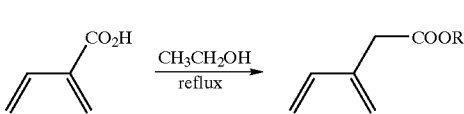

A stirred mixture of Compound 5 (9.3 g, 0.1 mol) and ethanol (4.6 g, 0.1 mol) in solvent was refluxed for 24 hours. The workup consisted of adding 15 mL methylene chloride and 15 mL water to the cooled reaction mixture, and separating the layers. The organic layer was washed with water, a 5% aqueous $NaHCO_3$ solution and a saturated sodium chloride solution and dried with magnesium sulfate. The solvent was then evaporated. The molecular weight of Compound 7 is 140 g/mol. A variety of esters can be synthesized by this method using the desired alcohol, ROH.

EXAMPLE 2

The object of this example is to show a preferred synthesis of disubstituted functionalized diene monomers of the formula:

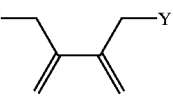

Compound 8: Y=CN

Compound 9: Y=NR$_2$ (9a: R=methyl; 9b: R=ethyl; 9c: R=n-propyl)

These disubstituted compounds are synthesized from a dibromide precursor. The synthesis of the precursor is described below, followed by the synthesis of Compounds 8 and 9.

17

Synthesis of 2,3-(dibromomethyl)-1,3-butadiene
Step 1.

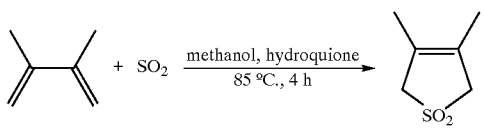

Newly distilled 2,3-dimethyl-1,3-butadiene was used in the reaction. 50 mL sulfur dioxide (liquid, cooled by acetone-dry ice bath), 95 mL isoprene, 40 mL methanol and 2 g hydroquinone were added to a 300 mL high-pressure reactor. The vessel was then heated to 85° C. for 4 hours. After being cooled to room temperature, yellow crystals precipitated. One recrystallization from water gave pure product in over 85% yield.
Step 2.

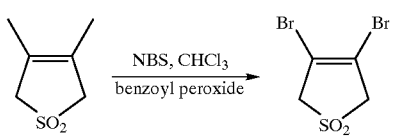

A 2 L flask was charged with 65 g of 3-methyl-2,5-dihydrothiophene-1,1-dioxide (1 L, 1.0 mol), 174 g N-bromosuccinimide, 6 g benzoyl peroxide and 1 L chloroform. The solution was refluxed at 70° C. for 24 hours. After the solution was cooled to room temperature, two-thirds of the chloroform wsa removed by rotary evaporation. The solid (succinimide) formed was removed by filtration. The last trace of chloroform was removed under reduced pressure. Methanol was added to the residual oil and the mixture was cooled in a refrigerator. The crystals formed in 18 hours. After two recrystallizations from ethanol, 60 g of product was obtained (40%).
Step 3.

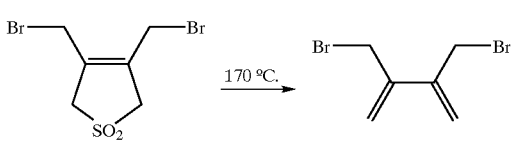

2,3-(dibromomethyl)-2,5-dihydrothiophene (31 g, 0.10 mol) was heated to 170° C. under reduced pressure in a flask connected to an ice-cooled receiver. The product was distilled and collected. After being bubbled with nitrogen, 19 g of light yellow liquid was obtained in high purity (80%).
Compound 8.

Similar to Compound 2, the dibromide made above is stirred at room temperature for 24 hours with sodium cyanide. To work up, the mixture was quenched with water. The product was extracted with ether, washed with water and saturated sodium chloride solution. The organic phase was dried using magnesium sulfate, filtered and evaporated to remove the solvent. The molecular weight of Compound 8 is 133 g/mol.
Compound 9.

Similar to Compounds 1a–1c, 4 equivalents of $HNR_2$ and ethyl ether was added to the dibromide dropwise. White salt formed immediately. The mixture was stirred for 20 hours. Saturated NaOH solution was added to the mixture until a pH of 11 was reached. Compound 9 was extracted with ethyl ether three times. After rotary evaporation, the product was cleaned by distillation under reduced pressure.

18

EXAMPLE 3

The object of this example is to show a preferred synthesis of disubstituted functionalized diene monomers of the formula:

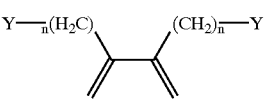

Compound 10: Y=COOEt
Compound 11: Y=CN
Synthesis of Compound 10
Step 1.

To a 1.0 round bottom flask equipped with a water condenser was added 700 mL of acetone and 90 g (600 mmol) of sodium iodide. Ethyl-4-chlorobutyrate (14 mL, 100 mmol) was added and refluxed overnight. The cooled solution was concentrated in a rotary evaporator. Approximately 100 mL of water was added to dissolve the salt, then extracted twice with ether (150 mL). The solution was concentrated to a yellow oil and distilled to a clear liquid, 23.5 g (98%). $^1$H-NMR (300 MHz, $CDCl_3$): 1.25 (t, 3H), 2.10 (p, 2H), 2.45 (t, 2H), 3.22 (5, 2H), 4.14 (q, 2H).
Step 2.

To an argon purged 3-neck 250 mL round bottom flask was added 26 g (400 mmol) of zinc granules and 80 mL of THF. Adding 8 mL of 1,2-dibromoethane and allowing this to reflux on its own, activated the zinc. Once this was cooled for 0.5 h, 8 mL of chlorotrimethylsilane was added. Ethyl-4-iodobutyrate was added and heated to 50° C. overnight to complete the zinc insertion.
Step 3.

To a 2-neck 500 mL round bottom flask was added 8.5 g (200 mmol) of lithium chloride. The flask was put under vacuum and flame dried several times to expel all water from the salt and the surface. After purging with argon, 9.0 g (100 mmol) of copper cyanide was added to the flask under a strong stream of argon. This flask was put under vacuum and purged with argon before the addition of the 80 mL of THF. The solution was cooled to −30° C. or less and the addition of the alkyl zinc iodide (no zinc pieces) was begun. The solution was warmed to 0° C. for ten minutes and then cooled to −78° C. or less and 4.4 mL (45 mmol) of 1,4-dichlorobutyne was added. The solution was allowed to warm slowly to room temperature overnight. The flask was opened to the atmosphere and poured into ammonium chloride to quench. The organic layer was extracted twice with 150 mL of ether and washed with brine. The organic layer was dried over magnesium sulfate, filter and concentrate to get a crude oil. $^1$H-NMR (300 MHz, $CDCl_3$): 1.26 (t, 6 H), 1.80 (p, 4 H), 2.28 (t, 4 H), 2.30 (t, 4 H), 4.12 (q, 4 H), 4.96 (d, 2 H), 5.11 (d, 2 H). High-resolution mass spectrometry: theoretical mass=282.18311, measured mass= 282.18298, deviation=−0.45 ppm.

The cyano product (Compound 11) was made in a similar procedure as Compound 10. However, the synthesis began with 4-chlorobutyronitrile. $^1$H-NMR (300 MHz, $CDCl_3$): 1.81 (tt(pentet), 4 H, J=7.33 Hz), 2.41 (t, 4 H), 2.34 (t, 4 H), 5.15 (d, 2 H), 5.04 (d, 2 H),

EXAMPLE 4

The object of this example is to provide polymerization procedures and resulting polymer properties obtained by reacting the functionalized diene monomers of the invention under various polymerization conditions. Representative functionalized polymers are set forth in Tables 1–11.

Bulk and Solution Free Radical Polymerization.

The monomer was purified by distillation in the presence of $CaH_2$ or letting it pass through a basic aluminum column. The initiator (such as AIBN (2,2'-azobisisobutyronitrile), BPO (benzoyl peroxide), t-butyl peroxide, t-butyl hydroperoxide, t-butyl perbenzoate, potassium persulfate, etc.) was purified by recrystallization or by reprecipitation. Monomer and initiator were placed in an ampoule. For the solution free radical polymerization, the chosen solvent is added in a desired volume/volume ratio (monomer:solvent). Solvents include hexane, benzene, anisole, bromobenzene, THF and dioxane, or any suitable solvent. The preferred solvents are bromobenzene, dioxane and THF. After three cycles of freeze-pump-thaw, the ampoule was sealed under vacuum and placed into an oil bath at the necessary temperature which is dependent on the halflife of the chosen initiator. At the end of the reaction, the ampoule was cooled to temperature below the monomer's boiling point and was broken. Polymer was removed out of the ampoule by dissolving in any suitable solvent (such as tetrahydrofuran, chloroform or methylene chloride) containing 50 mg of a stabilizer (such as 2,6-di-tert-butyl-4-methylphenol, 1,4-benzoquinone, etc.) which can prevent further reaction. The polymer was reprecipitated in a nonsolvent (such as methanol, water) or was obtained by evaporating the solvent. This type of polymerization is applicable to any of the monomers (Compounds 1–11 previously described and similar derivatives.

TEMPO Mediated Free Radical Polymerization

The monomer was purified by distillation in the presence of $CaH_2$ or letting it pass through a basic aluminum column. The initiator (such as AIBN (2,2'-azobisisobutyronitrile), BPO (benzoyl peroxide, t-butyl peroxide, t-butyl hydroperoxide, t-butyl perbenzoate, potassium persulfate, etc.) was purified by recrystallization or by reprecipitation. Monomer, initiator, nitroxide (such as hexane, toluene, benzene, anisole, etc.) if needed and other components (such as camphorsulfonic acid which may be used to reduce the reaction time) were placed in an ampoule. After three cycles of freeze-pump-thaw, the ampoule was sealed under vacuum and placed into an oil bath at the necessary temperature (such as 120° C. to 130° C.). At the end of the reaction, the ampoule was cooled to a temperature below the monomer's boiling point and was broken. Polymer was removed out of the ampoule by dissolving in a suitable solvent (such as tetrahydrofuran, chloroform or methylene chloride) containing 50 mg of stabilizer (such as 2,6-di-tert-butyl-4-methylphenol, 1,4-benzoquinone, etc.), which can prevent further reaction. The polymer was reprecipitated in a nonsolvent (such as methanol, water) or was obtained by evaporating the solvent. This type of polymerization is applicable to any of the monomers (Compounds 1–11) previously described, and similar derivatives.

Atom Transfer Radical Polymerization (ATRP).

The monomer was purified by distillation in the presence of $CaH_2$ or by passing it through a basic alumina column. Monomer, initiator (such as butyl bromide), ligand (such as bipyridyl, N, N, N', N', N"-pentamethyldiethylenetriamine), CuBr were placed in an ampoule. After three cycles of freeze-pump-thaw, the ampoule was sealed under vacuum and placed into an oil bath at the necessary temperature (such as 85° C.). At the end of the reaction, the ampoule was cooled to a temperature below the monomer's boiling point and was broken. Polymer was removed from the ampoule by dissolving in a suitable solvent (such as tetrahydrofuran, chloroform or methylene chloride) containing about 50 mg of stabilizer (such as 2,6-di-tert-butyl-4-methylphenol, 1,4-benzoquinone, etc.), which can prevent further reaction. The polymer was reprecipitated in a nonsolvent (such as methanol, water) or was obtained by evaporating the solvent. This type of polymerization is applicable to any of the monomers previously described.

Emulsion Polymerization.

The monomers were purified by distillation in the presence of CaH. All the reactions were carried out in 3-neck round bottom flask equipped with magnetic stir, a reflux condenser and two stoppers. This was supplied with $N_2$ (via a mineral oil bubbler) through a gas inlet adapter. The chemicals (initiator, monomer, water, buffer and surfactant, etc.) were added to the flask and then degassed for half an hour by running $N_2$ through a needle. Other ingredients in the emulsion system vary depending on the starting compound used and the desired final properties. The vessel was then heated to 80° C. in an oil bath. A few drops of BHT (2,6-di-t-butyl4-methylphenol) acetone solution would be added to the mixture at the end of the reaction to prevent further polymerization. HCl (5%) solution was then added to the vessel until the polymer precipitated from the solution. The polymers were further dried under vacuum at 40–60° C.

Anionic Polymerization.

All anionic polymerizations were carried out under high vacuum conditions using tempertatures in the range of −78 to 25° C. All solutions were degassed twice and then transferred via syringe under an argon atmosphere. Benzene (30 mL) was distilled into a 250 mL reaction flask and then sec-butyllithium (0.65 mmol) was added. After setting the correct temperature for the reaction, the monomer was added. The amount of monomer added will be dependent upon the desired MW (molecular weight=grams of monomer over moles of initiator). The polymerizations were terminated with degassed methanol (10 mL) after 2 hours, and then precipitated into excess methanol (500 mL). After filtration, the samples were washed with more methanol (200 mL), the samples were then placed into a vacuum oven overnight before analysis. The solvents used for the polymerizations included benzene, hexane and THF. The initiators used include alkyllithiums, oligo(α-methylstyryl) potassium, cumyl potassium or lithium naphthalenide, etc. This procedure can be utilized for all monomers (Compounds 1–11) described herein. Depending on the monomer activity and functional group reactivity, the starting compounds may be protected then deprotected or the polymerization conditions altered. This will avoid side reactions.

TABLE 1

Bulk Free Radical Polymerization Compound 1a: 2-(N,N-diethylaminomethyl)-1,3-butadiene

| Methyl | 1 | 2 | 3 | 4 | 5 | 6 | 7 | 8 |
|---|---|---|---|---|---|---|---|---|
| Initiator mol % | AIBN 1.50 | AIBN 1.00 | AIBN 0.75 | AIBN 0.50 | AIBN 0.25 | t-BPA 1.50 | t-BPA 1.00 | t-BPA 0.75 |

TABLE 1-continued

Bulk Free Radical Polymerization Compound 1a: 2-(N,N-diethylaminomethyl)-1,3-butadiene Reaction Components
Solvent

| | | | | | | | | |
|---|---|---|---|---|---|---|---|---|
| Temp (° C.) | 72 | 72 | 72 | 72 | 72 | 100 | 100 | 100 |
| Time (h) | 24 | 24 | 24 | 24 | 24 | 24 | 24 | 24 |
| Intrinsic Viscosity (dL/g) | 0.2840 | 0.2246 | 0.1130 | 0.1232 | 0.1393 | 0.1844 | 0.2454 | 0.2108 |
| $T_g$ (° C.) | −21.2 | −25.3 | −32.3 | −32.1 | −24.0 | −29.4 | −28.7 | −24.0 |
| % cis 1,4 | 62 | 67 | 58 | 52 | 64 | 59 | 42 | 58 |
| % trans 1,4 | 36 | 33 | 37 | 42 | 32 | 31 | 22 | 36 |
| % 1,2 | — | — | — | — | — | 3 | — | — |
| % 4,3 | 2 | — | 5 | 6 | 4 | 7 | 36 | 6 |
| Note | bulk | bulk | bulk | bulk | bulk | bulk | bulk | bulk |

| Methyl | 9 | 10 | 11 | 12 | 13 | 14 | 15 |
|---|---|---|---|---|---|---|---|
| Initiator mol % | t-BPA 0.50 | t-BPA 0.25 | t-BHP 1.50 | t-BHP 1.00 | t-BHP 0.75 | t-BHP 0.50 | t-BHP 0.25 |
| Reaction Components Solvent | | | | | | | |
| Temp (° C.) | 100 | 100 | 125 | 125 | 125 | 125 | 125 |
| Time (h) | 24 | 24 | 24 | 24 | 24 | 24 | 24 |
| Intrinsic Viscosity (dL/g) | 0.1988 | 0.2186 | 0.0823 | 0.1987 | x-linked | x-linked | x-linked |
| $T_g$ (° C.) | −31.0 | −34.5 | −46.1 | −43.5 | −75.8 | −70.0 | x-linked |
| % cis 1,4 | 60 | 58 | 64 | 65 | 63 | 58 | — |
| % trans 1,4 | 33 | 30 | 36 | 35 | 37 | 42 | — |
| % 1,2 | — | — | — | — | — | — | — |
| % 4,3 | 7 | 12 | <1 | <1 | <1 | <1 | — |
| Note | bulk | bulk | bulk | bulk | bulk | bulk | bulk |

TABLE 2

Bulk Free Radical Polymerizarion Compound 1b: 2-(N,N-diethylaminomethyl)-1,3-butadiene

| Methyl | 1 | 2 | 3 | 4 | 5 | 6 | 7 | 8 |
|---|---|---|---|---|---|---|---|---|
| Initiator mol % | AIBN 1.50 | AIBN 1.00 | AIBN 0.75 | AIBN 0.50 | AIBN 0.25 | t-BPA 1.50 | t-BPA 1.00 | t-BPA 0.75 |
| Reaction Components Solvent | | | | | | | | |
| Temp (° C.) | 70 | 70 | 70 | 70 | 70 | 100 | 100 | 100 |
| Time (h) | 24 | 24 | 24 | 24 | 24 | 24 | 24 | 24 |
| Intrinsic Viscosity (dL/g) | 7000 | — | 12000 | 16000 | 17000 | Cross-linked | Cross-linked | 18000 |
| $T_g$ (° C.) | 1.64 | — | 1.49 | 1.45 | 1.46 | — | — | 1.36 |
| % cis 1,4 | −49 | — | −51 | −53 | −52 | — | — | −56 |
| % trans 1,4 | — | — | 29 | 66 | — | — | — | — |
| % 1,2 | — | — | 1.7 | 0 | — | — | — | — |
| % 4,3 | — | — | 2.3 | 6 | — | — | — | — |
| Note | bulk | bulk | bulk | bulk | bulk | bulk | bulk | bulk |

| Methyl | 9 | 10 | 11 | 12 | 13 | 14 | 15 |
|---|---|---|---|---|---|---|---|
| Initiator mol % | t-BPA 0.50 | t-BPA 0.25 | t-BHP 1.50 | t-BHP 1.00 | t-BHP 0.75 | t-BHP 0.50 | t-BHP 0.25 |
| Reaction Components Solvent | | | | | | | |
| Temp (° C.) | 100 | 100 | 130 | 130 | 130 | 130 | 130 |
| Time (h) | 24 | 24 | 24 | 24 | 24 | 24 | 24 |
| Intrinsic Viscosity (dL/g) | 20000 | 20000 | 10000 | 13000 | 20000 | — | 24000 |
| $T_g$ (° C.) | 1.32 | 1.53 | 1.75 | 1.73 | 1.54 | — | 1.68 |
| % cis 1,4 | −58 | −68 | −72 | −75 | −82 | — | −84 |
| % trans 1,4 | 69 | — | — | — | — | 56 | — |
| % 1,2 | 0 | — | — | — | — | 0 | — |
| % 4,3 | 6 | — | — | — | — | 10 | — |
| Note | bulk | bulk | bulk | bulk | bulk | bulk | bulk |

TABLE 3

Emulsion Polymerization of Compound 1b: 2-(N,N-diethylaminomethyl)-1,3-butadiene

| Entry | 1 | 2 | 3 | 4 | 5 | 6 |
|---|---|---|---|---|---|---|
| Compound 1b | 25 | 75 | 100 | 100 | 25 | 100 |
| Emulsifier | 5 | 5 | 5 | 5 | 5 | 5 |
| Initiator (%)[a] | 0.15 | 0.15 | 0.15 | 0.15 | 0.15 | 0.15 |
|  | $K_2S_2O_8$ | $K_2S_2O_8$ | $K_2S_2O_8$ | $K_2S_2O_8$ | AIBN | AIBN |
| Water | 180 | 180 | 180 | 180 | 180 | 180 |
| Temp (° C.) | 80 | 80 | 80 | 80 | 80 | 80 |
| Time (h) | 4 | 4 | 4 | 4 | 4 | 8 |
| $M_n \times 10^{-3b}$ | 21 | 25.6 | 34 | Cross-linked | 38 | Cross-linked |
| PDI | 1.47 | 1.29 | 1.38 |  | 1.45 |  |
| Yield (%) | 50 | 55 | 60 |  | 50 |  |
| % cis 1,4 | 24 | 24 | 24 |  | 24 |  |
| % trans 1,4 | 68 | 68 | 68 |  | 68 |  |
| % 1,2 | 0 | 0 | 0 |  | 0 |  |
| % 4,3 | 5 | 5 | 5 |  | 5 |  |

*all number for Compound 1b, styrene, emulsifier, water, and initiator are given as % by weight

TABLE 4

Emulsion Copolymerization of Styrene and Compound 1b: 2-(N,N-diethylaminomethyl)-1,3-butadiene

| Entry | 1 | 2 | 3 |
|---|---|---|---|
| Atyrene | 75 | 50 | 25 |
| Compound 1b | 25 | 75 | 100 |
| $K_2S_2O_4$ | 0.3 | 0.3 | 0.3 |
| Water | 180 | 180 | 180 |
| Time (h) | 4 | 4 | 4 |
| Temp (° C.) | 80 | 80 | 80 |
| Intrinsic viscosity | 0.1019 | 0.2362 | x-linked in air |
| $T_g$ (° C.) | 62 | 19 | −27 |
| Styrene content in copolymer (%) | 94 | 58 | 29 |
| N,N-diethylaminoisoprene content in copolymer (%) | 6 | 42 | 71 |
| Yield (%) | 94 | 91 | 85 |

TABLE 5

Bulk Free Radical Polymerization of Compound 1c: 2-(N,N-di-n-propylaminomethyl)-1,3-butadiene

| Propyl | 1 | 2 | 3 | 4 | 5 | 6 | 7 | 8 |
|---|---|---|---|---|---|---|---|---|
| Initiator mol % | AIBN | AIBN | AIBN | AIBN | AIBN | t-BPA | t-BPA | t-BPA |
|  | 1.50 | 1.00 | 0.75 | 0.50 | 0.25 | 1.50 | 1.00 | 0.75 |
| Reaction Components Solvent |  |  |  |  |  |  |  |  |
| Temp (° C.) | 72 | 72 | 72 | 72 | 72 | 100 | 100 | 100 |
| Time (h) | 24 | 24 | 24 | 24 | 24 | 24 | 24 | 24 |
| $M_n$ (g/mol) | 15000 | 21000 | 27000 | 40000 | 42000 | 8800 | 16600 | 14100 |
| PDI | 2.05 | 1.83 | 1.70 | 1.81 | 1.78 | 1.79 | 1.74 | 1.80 |
| $T_g$ (° C.) | −62.2 | −56.5 | −57.3 | −46.6 | −56.3 | −71.5 | −74.5 | −78.2 |
| % cis 1,4 | 74 | 70 | — | 74 | 67 | 71 | 73 | 72 |
| % trans 1,4 | 24 | 30 | — | 26 | 27 | 29 | 27 | 28 |
| % 1,2 | — | — | — | — | — | — | — | — |
| % 4,3 | 2 | — | — | — | <1 | <1 | <1 | <1 |
| Note | bulk | bulk | bulk | bulk | bulk | bulk | bulk | bulk |

| Propyl | 9 | 10 | 11 | 12 | 13 | 14 | 15 |
|---|---|---|---|---|---|---|---|
| Initiator mol % | t-BPA | t-BPA | t-BHP | t-BHP | t-BHP | t-BHP | t-BHP |
|  | 0.50 | 0.25 | 1.50 | 1.00 | 0.75 | 0.50 | 0.25 |
| Reaction Components Solvent |  |  |  |  |  |  |  |
| Temp (° C.) | 100 | 100 | 125 | 125 | 125 | 125 | 125 |
| Time (h) | 24 | 24 | 24 | 24 | 24 | 24 | 24 |
| $M_n$ (g/mol) | 20200 | 26200 | 7800 | 11000 | 12800 | 16700 | 18400 |
| PDI | 1.77 | 1.61 | 2.17 | 2.03 | 2.03 | 1.86 | 2.15 |
| $T_g$ (° C.) | −76.1 | −89.0 | −86.0 | −86.1 | −89.5 | −84.8 | −94.9 |
| % cis 1,4 | 73 | 73 | 76 | 72 | 71 | 71 | 69 |
| % trans 1,4 | 27 | 27 | 24 | 28 | 29 | 29 | 31 |
| % 1,2 | — | — | — | — | — | — | — |
| % 4,3 | <1 | <1 | <1 | <1 | <1 | <1 | <1 |
| Note | bulk | bulk | bulk | bulk | bulk | bulk | bulk |

TABLE 6

Bulk Free Radical Polymerization of Compound 2: 2-(cyanomethyl)-1,3-butadiene

| Entry | 1 | 2 | 3 | 4 | 5 | 6 |
|---|---|---|---|---|---|---|
| Initiator | 1% AIBN | 1% AIBN | 1% AIBN | 1% AIBN | 1% AIBN | 1% AIBN |
| Solvent | None | None | None | None | None | None |
| Reaction component | None | None | None | None | None | None |
| Temp (° C.) | 60 | 60 | 60 | 60 | 60 | 60 |
| Time (h) | 1 | 2 | 3 | 4 | 5 | 6 |
| Yield (%) | 7 | 13 | 20 | 29 | 37 | 44 |
| $M_n$ (×10$^{-3}$) | 28.5 | 27.6 | 27.6 | 27.6 | 33.7 | 35.8 |
| PDI | 1.91 | 1.53 | 1.55 | 1.64 | 1.57 | 1.61 |
| $T_g$/° C. | | | | | | |
| Note | Bulk | Bulk | Bulk | Bulk | Bulk | Bulk |
| Micro-structure | Almost 1,4, cis:trans ≅ 1:2 | Almost 1,4, cis:trans ≅ 1:2 | Almost 1,4, cis:trans ≅ 1:2 | Almost 1,4, cis:trans ≅ 1:2 | Almost 1,4, cis:trans ≅ 1:2 | Almost 1,4, cis:trans ≅ 1:2 |

TABLE 7

Kinetics Study of Bulk Free Radical Polymerication of Compound 2: 2-(cyanomethyl)-1,3-butadiene

| Monomer # | 2 | 2 | 2 | 2 | 2 | 2 | 2 |
|---|---|---|---|---|---|---|---|
| Initiator | 1% AIBN | 1% AIBN | 1% AIBN | 1% AIBN | 1% AIBN | 1% AIBN | 1% AIBN |
| Solvent | None | None | None | None | None | None | None |
| Reaction component | None | None | None | None | None | None | None |
| Temp (° C.) | 75 | 75 | 75 | 75 | 75 | 75 | 75 |
| Time (min) | 20 | 40 | 60 | 80 | 100 | 120 | 140 |
| Yield (%) | 11 | 23 | 34 | 43 | 59 | 77 | 91 |
| $M_n$ (×10$^{-3}$) | 20.2 | 20.7 | 21.4 | 25.9 | 25.7 | 37.2 | 33.9 |
| PDI | 1.50 | 1.47 | 1.52 | 1.50 | 1.71 | 1.93 | 3.37 |
| $T_g$/° C. | | | | | | −18 | |
| Note | Bulk | Bulk | Bulk | Bulk | Bulk | Bulk | Bulk |
| Micro-structure | Almost 1,4, cis:trans ≅ 1:1 | Almost 1,4, cis:trans ≅ 1:1 | Almost 1,4, cis:trans ≅ 1:1 | Almost 1,4, cis:trans ≅ 1:1 | Almost 1,4, cis:trans ≅ 1:1 | Almost 1,4, cis:trans ≅ 1:1 | Almost 1,4, cis:trans ≅ 1:1 |

TABLE 8

Solution Free Radical Polymerization of Compound 2: 2-(cyanomethyl)-1,3-butadiene

| Entry | 1 | 2 | 3 | 4 | 5 | 6 | 7 | 8 | 9 | 10 |
|---|---|---|---|---|---|---|---|---|---|---|
| Initiator | 1% BPO | 1% BPO | 1% BPO | 0.1% BPO | 0.1% BPO | 0.05% BPO | 0.01% BPO | 0.1% BPO | 0.05% BPO | 0.01% BPO |
| Solvent | 1:1 THF | 2:1 THF | 3:1 THF | 1:1 THF | 1:1 THF | 1:1 THF | 1:1 THF | 0.5:1 THF | 0.5:1 THF | 0.5:1 THF |
| Reaction Components | None | None | None | None | None | None | None | None | None | None |
| Temp (° C.) | 75 | 75 | 75 | 75 | 75 | 75 | 75 | 75 | 75 | 75 |
| Time (h) | 12 | 12 | 12 | 12 | 24 | 24 | 24 | 24 | 24 | 24 |
| Yield % | 70 | 42 | 36 | 30 | 46 | 22 | 12 | 53 | 35 | 24 |
| $M_n$ (×10$^{-3}$) | 3.26 | 2.06 | 1.61 | 5.90 | 6.62 | 6.88 | 8.12 | 8.21 | 7.80 | 8.73 |
| PDI | 2.28 | 1.60 | 1.58 | 1.75 | 1.89 | 1.73 | 1.73 | 2.28 | 1.95 | 1.86 |
| $T_g$ (° C.) | | | | | | | | | | |
| Note | Solution | Solution | Solution | Solution | Solution | Solution | Solution | Solution | Solution | Solution |
| Micro-structure | Almost 1,4, cis:trans ≅ 1:1 | Almost 1,4, cis:trans ≅ 1:1 | Almost 1,4, cis:trans ≅ 1:1 | In 1,4, cis:trans ≅ 1:1 | In 1,4, cis:trans ≅ 1:1 | In 1,4, cis:trans ≅ 1:1 | In 1,4, cis:trans ≅ 1:1 | In 1,4, cis:trans ≅ 1:1 | In 1,4, cis:trans ≅ 1:1 | In 1,4, cis:trans ≅ 1:1 |

TABLE 9

Solution Copolymerization of Styrene and Compound 2: 2-(cyanomethyl)-1,3-butadiene

| Initiator | 1% BPO | 1% BPO | 1% BPO | 1% BPO | 1% BPO |
|---|---|---|---|---|---|
| Temp (° C.) | 75 | 75 | 75 | 75 | 75 |
| Time (h) | 12 | 12 | 12 | 12 | 24 |
| Compound 2 Feed Ratio | 0.15 | 0.25 | 0.53 | 0.75 | 0.85 |
| Conversion % of 2 | 82 | 70 | 64 | 62 | 64 |
| Conversion of Styrene | 37 | 22 | 17 | 16 | 23 |

TABLE 9-continued

Solution Copolymerization of Styrene and Compound 2: 2-(cyanomethyl)-1,3-butadiene

| Compound 2: Styrene Ratio in Polymer | 0.28 | 0.51 | 0.77 | 0.92 | 0.94 |
|---|---|---|---|---|---|
| $M_n$ (×10$^{-3}$) | | 17.7 | 18.7 | 21.6 | 25.8 | 29.6 |
| PDI | | 1.58 | 1.77 | 1.97 | 2.08 | 2.10 |
| $T_g$ (° C.) | | 60.6 | 45.7 | 13.6 | 2.7 | −2.9 |

TABLE 10

Bulk Free Radical Polymerization of Compound 10: 2,3-bis(4-ethoxy-4-oxobutyl)-1,3-butadiene

| Entry | 1 | 2 | 3 | 4 | 5 | 6 |
|---|---|---|---|---|---|---|
| Initiator mol % | 0.5 | 1 | 2 | 3 | 0.5 | 1 |
| Reaction Components | TBHP | TBHP | TBHP | TBHP | BPO | BPO |
| Solvent | Bulk | Bulk | Bulk | Bulk | Bulk | Bulk |
| Temp (° C.) | 125 | 125 | 125 | 125 | 75 | 75 |
| Time (h) | 24 | 24 | 24 | 24 | 24 | 24 |
| $M_n$ (g/mol) | 60953 | 48055 | 42400 | 44873 | 33531 | 26588 |
| PDI | 2.57 | 2.84 | 3.39 | 3.94 | 1.74 | 1.78 |
| $T_g$ (° C.) | | | | | | |
| Micro-structure | 1,4 | 1,4 | 1,4 | 1,4 | 1,4 | 1,4 |

| Entry | 7 | 8 | 9 | 10 | 11 | 12 |
|---|---|---|---|---|---|---|
| Initiator mol % | 2 | 3 | 0.5 | 1 | 2 | 3 |
| Reaction Components | BPO | BPO | TBPA | TBPA | TBPA | TBPA |
| Solvent | Bulk | Bulk | Bulk | Bulk | Bulk | Bulk |
| Temp (° C.) | 75 | 75 | 100 | 100 | 100 | 100 |
| Time (h) | 24 | 24 | 24 | 24 | 24 | 24 |
| $M_n$ (g/mol) | 18128 | 16536 | 80581 | 62619 | 61550 | 59590 |
| PDI | 1.84 | 0.95 | 2.17 | 2.35 | 2.69 | 2.8 |
| $T_g$ (° C.) | | | −48.59 | | | |
| Micro-structure | 1,4 | 1,4 | 1,4 | 1,4 | 1,4 | 1,4 |

TABLE 11

Kinetic Study of Bulk Free Radical Polymerization of Compound 10 at 125° C.: 2,3-bis(4-ethoxy-4-oxobutyl)-1,3-butadiene

| Entry | 1 | 2 | 3 | 4 | 5 | 6 | 7 | 8 |
|---|---|---|---|---|---|---|---|---|
| Initiator mol % | 0.5 | 0.5 | 0.5 | 0.5 | 0.5 | 0.5 | 0.5 | 0.5 |
| Reaction Components | TBHP | TBHP | TBHP | TBHP | TBHP | TBHP | TBHP | TBHP |
| Solvent | Bulk | Bulk | Bulk | Bulk | Bulk | Bulk | Bulk | Bulk |
| Temp (° C.) | 125 | 125 | 125 | 125 | 125 | 125 | 125 | 125 |
| Time (h) | 0.17 | 0.25 | 0.33 | 0.42 | 0.5 | 1 | 1.5 | 2 |
| $M_n$ (g/mol) | 28884 | 32043 | 30474 | 33445 | 29852 | 33185 | 34382 | 34898 |
| PDI | 1.47 | 1.47 | 1.58 | 1.59 | 1.61 | 1.65 | 1.69 | 1.85 |
| $T_g$ (° C.) | | | | | | | | |
| Micro-structure | 1,4 | 1,4 | 1,4 | 1,4 | 1,4 | 1,4 | 1,4 | 1,4 |

| Entry | 9 | 10 | 11 | 12 | 13 | 14 | 15 | 16 |
|---|---|---|---|---|---|---|---|---|
| Initiator mol % | 0.5 | 0.5 | 0.5 | 0.5 | 0.5 | 0.5 | 0.5 | 0.5 |
| Reaction Components | TBHP | TBHP | TBHP | TBHP | TBHP | TBHP | TBHP | TBHP |
| Solvent | Bulk | Bulk | Bulk | Bulk | Bulk | Bulk | Bulk | Bulk |
| Temp (° C.) | 125 | 125 | 125 | 125 | 125 | 125 | 125 | 125 |
| Time (h) | 2.5 | 3 | 3.5 | 4 | 8 | 12 | 16 | 20 |
| $M_n$ (g/mol) | 37175 | 40213 | 39196 | 48049 | 58070 | 73888 | 84887 | 69864 |
| PDI | 1.78 | 1.91 | 2.02 | 2.13 | 2.48 | 2.56 | 2.77 | 2.86 |
| $T_g$ (° C.) | | | | | −54.78 | −52.01 | −50.57 | |
| Micro-structure | 1,4 | 1,4 | 1,4 | 1,4 | 1,4 | 1,4 | 1,4 | 1,4 |

I claim:

1. A method of making a disubstituted functionalized diene compound of the formula:

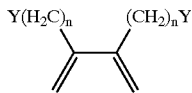

where Y is COOEt or CN, comprising the step of reacting 1,2-dibromomethane with a compound selected from the group consisting of a 4-halonitrile and an alkyl-4-haloester.

2. The method of claim 1, wherein said alkyl-4-haloester is ethyl-4-chlorobutyrate.

3. The method of claim 1, wherein said 4-halonitrile is 4-chloro-butyronitrile.

4. The method of claim 1 comprising the further step of polymerizing said functionalized diene compound to produce a functionalized diene polymer.

5. The method of claim 4 wherein said polymer is a copolymer.

6. The method of claim 5 wherein said copolymer comprises at least one monomer selected from the group consisting of diene monomers and vinyl monomers.

7. The method of claim 6 wherein said diene monomer is selected from the group consisting of butadiene, isoprene, piperylene, and hexadienes.

8. The method of claim 6 wherein said vinyl monomer is selected from the group consisting of styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid, and acrylic acid.

* * * * *